United States Patent

Willinger

[15] 3,640,516
[45] Feb. 8, 1972

[54] AERATING DEVICE
[72] Inventor: Allan H. Willinger, Rochelle, N.Y.
[73] Assignee: Metaframe Corporation, Maywood, N.J.
[22] Filed: Mar. 18, 1970
[21] Appl. No.: 20,605

[52] U.S. Cl. .................. 261/121 M, 210/169, 261/121 R
[51] Int. Cl. ........................................................ B01f 3/04
[58] Field of Search ............... 210/169; 261/121 M, 121 R, 261/77

[56] References Cited

UNITED STATES PATENTS

| | | | |
|---|---|---|---|
| 3,192,146 | 6/1965 | Vellas et al. | 210/169 |
| 976,242 | 11/1910 | Wohlfahrt | 210/169 |
| 2,207,514 | 7/1940 | Haldeman | 210/169 |
| 179,977 | 6/1876 | Turrettini | 261/77 |
| 2,303,757 | 12/1942 | Pierson | 210/169 |
| 2,050,771 | 8/1936 | Wait | 261/77 |
| 2,020,850 | 11/1935 | Myhren et al. | 261/77 |
| 3,321,081 | 5/1967 | Willinger | 210/169 |
| 3,189,334 | 6/1965 | Bell | 261/121 M |

FOREIGN PATENTS OR APPLICATIONS 609,508  2/1935  Germany ........................... 261/121 M Primary Examiner—Tim R. Miles
Attorney—Friedman & Goodman

[57] ABSTRACT

An aerating device having a sleevelike member for attaching the device to the discharge end of a filter tube supplying a liquid to an aquarium tank. The liquid flows through a conical conduit positioned within an air chamber in the device to achieve a venturi effect so that the moving liquid draws the air from the air chamber, and carries the air into a conical discharge end of the device. The discharge end forces the air into the body of the liquid before the mixture of air and liquid is discharged into the aquarium liquid within the tank. A valve positioned on the device regulates the amount of the air to be supplied to the aquarium liquid. The device has a filter to purify the air being supplied and reduces any noise which may be generated by the suction action of the device.

10 Claims, 2 Drawing Figures

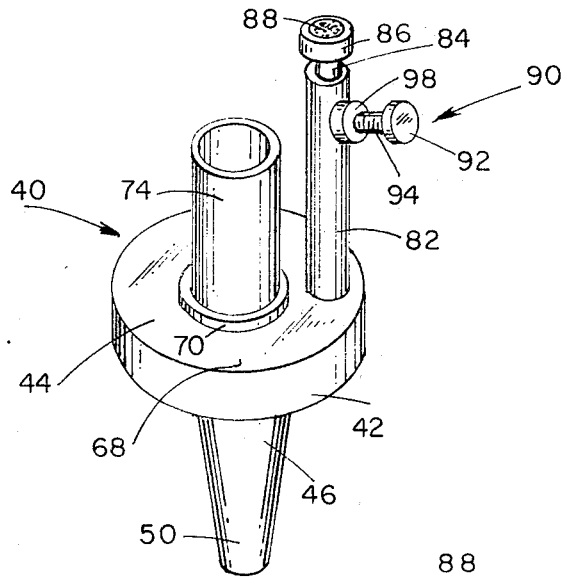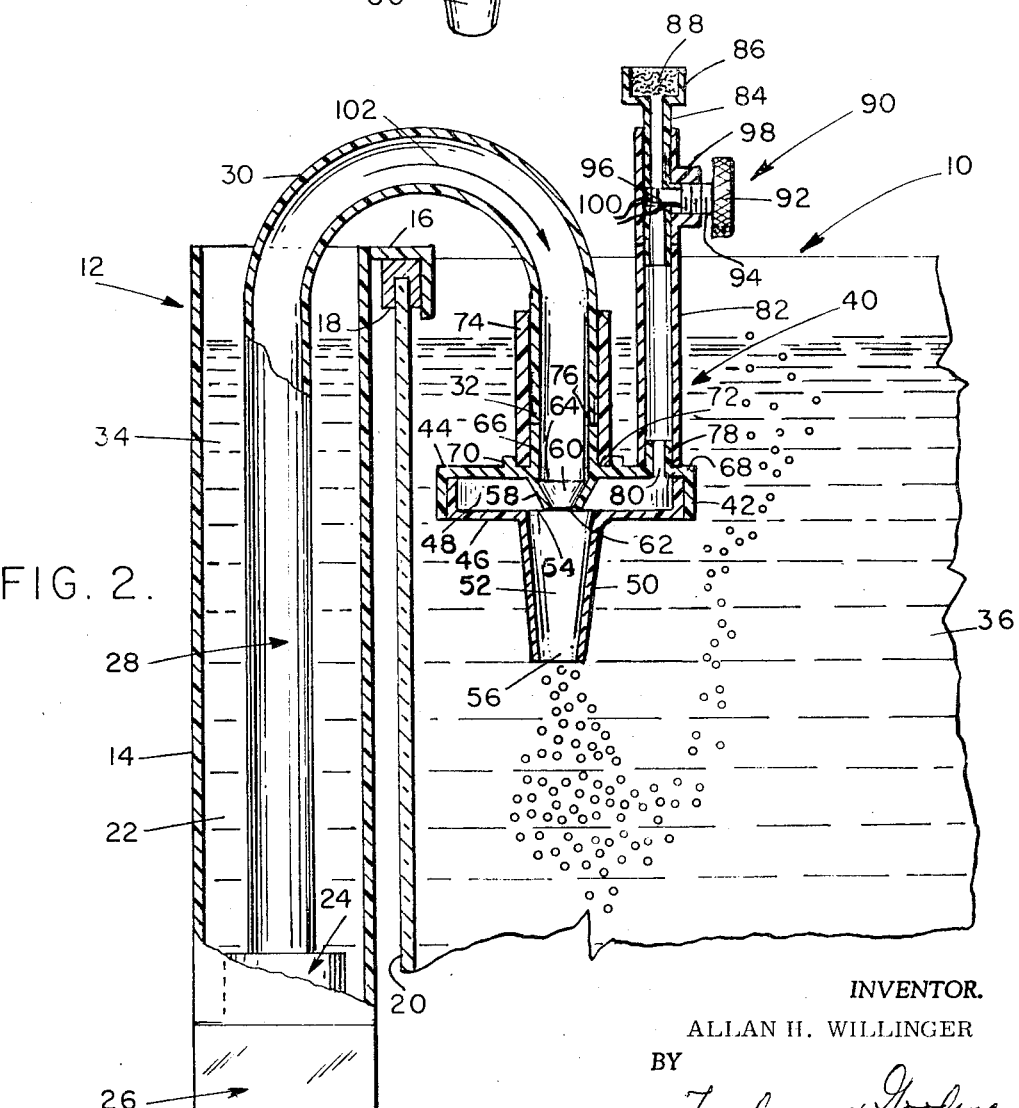

AERATING DEVICE

BACKGROUND OF THE INVENTION

Aerating devices are well known, particularly those in aquarium tanks. It has been found desirable under many circumstances to circulate the aquarium water, particularly for the purposes of aeration and filtration. In order to support the plants and fish in the aquarium, sufficient amounts of oxygen must be supplied to the aquarium water. The aerating device supplies this needed oxygen. U.S. Pat. No. 3,321,081, granted May 23, 1967 to Willinger discloses an aerating device. Willinger mounts a venturi-type aerator on the outlet end of a clean water return tube supplying water to the aquarium tube. Accordingly, there has been a longfelt need for a simple, inexpensive aerating device that is highly efficient in operation to supply a proper amount of air to the aquarium tank.

SUMMARY OF THE INVENTION

This invention relates to an aerating device, and more particularly to an aerator for use with aquarium filter equipment. A sleevelike member of the aerating device is attached to the discharge end of a filter tube supplying a liquid to an aquarium tank. A discharge end of the device is submerged in the aquarium liquid within the tank. The liquid flowing through the device draws air from an air chamber within the device by a venturi effect, and carries the air into the discharge end. Before discharging the mixture of air and liquid into the aquarium liquid, the discharge end forces the air into the body of the liquid so that the air is carried by the liquid to a greater depth in the aquarium liquid. The device has valve means to regulate the amount of the air to be supplied to the aquarium liquid and also filter means for purifying the air being supplied.

Accordingly, an object of the present invention is to provide a device for aerating a liquid which overcomes the disadvantages of the prior art aerators.

Another object of the invention is to provide an aerating device which is extremely simple in operation and includes no parts which can get out of order through operation or continued use, whereby the aerating device can be readily produced and maintained with relatively little expense, and which is nevertheless highly efficient in operation and has a relatively long trouble-free life.

A further object of this invention is to provide an aerating device suitable for use with an aquarium, which can be readily used with existing aquarium equipment.

A still further object of this invention is to provide an aerating device which can regulate the amount of air to be supplied to a liquid.

An added object of this invention is to provide an aerating device which can purify the air being supplied to a liquid.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which:

FIG. 1 represents a perspective view of an improved aerating device pursuant to the present invention;

FIG. 2 represents a fragmentary, partly sectional side elevational view of an aquarium tank provided with a filtration device, showing the aerating device of this invention.

DESCRIPTION OF THE PREFERRED EMBODIMENT

Referring to the drawings, FIG. 2 illustrates a conventional aquarium tank 10 which is provided with a filtration device 12. The filtration device 12 is of the external type and, as here shown, comprises a filter receptacle 14 which is suspended on the outer surface of the aquarium tank 10. More specifically, the filter receptacle 14 is provided with a laterally extending flange 16 which is hooked over a preferably metallic rim 18 provided on the adjacent sidewall 20 of the aquarium tank 10. The filter receptacle 14 is essentially rectangular in conformation and is provided with a bottom wall on which there is mounted a platform (not shown) which serves to define a clean liquid chamber below the platform, and a filter chamber 22 above the platform which is provided with conventional filter material.

The platform mounts a centrifugal pump 24. In order to operate the pump 24, provision is made for an electric motor (not shown) housed within a motor housing 26 which is mounted on the bottom wall of the filter receptacle 14. A clean liquid return tube 28 is secured to the upper portion of the pump 24. The tube 28 is provided with a bend 30 at its upper end, which extends over the rim 18 on the upper marginal edge of the wall 20 of the aquarium tank 10, so that the outlet end 32 of the tube 28 overlies the interior of the aquarium tank 10.

When the motor is energized, the pump 24 is started, whereby the centrifugal pump action causes the liquid 34 in the chamber below the platform to be drawn into the pump 24. The pump action forces the liquid 34 up the tube 28, whereby the liquid is then discharged into the aquarium liquid 36 in the aquarium tank 10. As the liquid 34 is drawn from the lower chamber, additional liquid 52 from the upper chamber 22 continues to filter through the filter material therein and pass through apertures formed in the platform to provide a continuous supply of clean liquid into the lower chamber. Usually, the aquarium tank 10 is provided also with a conventional siphon tube (not shown) to transfer the liquid 36 in the aquarium tank 10 to the filter receptacle 14, so as to provide a continuous flow of aquarium liquid 36 from the aquarium tank 10 back into the filter receptacle 14 for the filtration and then the return of the liquid 34 (formally liquid 36) back into the aquarium tank 10. The liquids 34, 36 are usually water.

The structure described above is relatively common to aquariums, although modifications thereof are frequently found, whereby such structure is set forth in the above mentioned U.S. Pat. No. 3,321,081, which may be referred to for a more detailed description thereof. In accordance with the principles of the present invention, an aerating device 40 is provided which may easily cooperate with the above mentioned aquarium structure, wherein the present invention will now be set forth in detail, hereinbelow.

Referring again to the drawings, FIGS. 1 and 2 illustrate an aerating device or aerator 40 of the present invention. The aerator includes a cylindrical two-part housing 42 having an upper housing member 44 and a lower housing member 46. The lower member 46 tightly fits within the upper member 44 to define a cylindrical air chamber 48 therebetween, whereby the members 44, 46 may be secured together by conventional means or may be molded as one piece using suitable material.

The lower member includes a centrally located, conically shaped discharge portion 50, defining a discharge chamber 52, extending downwardly from the air chamber 48. The discharge chamber 52 communicates with the air chamber 48, where the opening 54 therebetween is larger than the opening 56 at the distal end of the discharge portion 50.

The upper member 44 includes a centrally located conically shaped conduit portion 58, defining a chamber 60, extending downwardly into the air chamber 48. The conduit portion 58 is positioned directly above the discharge portion 50, both portions 50, 58 having the same longitudinal axis. The conduit portion 58 extends downwardly to the opening 54 between the air chamber 48 and the discharge chamber 52, with conduit portion 58 having an opening 62 in the same horizontal plane as opening 54. The opening 54 is larger than the opening 62, so that both the air chamber 48 and the chamber 60 communicate with the discharge chamber 52. The opening 64 at the other end of the conduit portion 58 is larger than opening 62.

A centrally located annular flange 66 extends upwardly from a top portion 68 of the upper member 44, directly above the conduit portion 58. The inner diameter of the flange 66 is equal to the opening 64 which is between the flange 66 and the conduit portion 58. Another annular flange 70 extends upwardly from the top portion 68 and is concentrically disposed around the flange 66 to define a groove 72. The flange 70 is shorter than the flange 66.

A flexible sleevelike member 74 is secured between the flanges 66, 70 within the groove 72, with a major portion of the member 74 extending upwardly from the top portion 68 of the member 44, projecting beyond the end 76 of the flange 66. The end 76 defines an abutment within the sleevelike member 74. The member 74 may be suitably secured in a substantially permanent manner, as by a suitable adhesive or solvent bond, within the groove 72.

A third annular flange 78, extending upwardly from the top portion 68 of the upper member 44, is concentrically disposed around an opening 80 in the top portion 68, communicating with the air chamber 48. The flange 78 is located near an edge of the upper member 44. One end of a tube 82 is frictionally fitted over the flange 78 and may be permanently secured thereto in a conventional manner. The other end of the tube 82 receives a tube 84. The free end 86 of the tube 84 is cup shaped to receive and hold an air filter 88 of the conventional type.

A needle valve 90, including a knurled head 92, a threaded body 94 and a projecting pin member 96, is screwed into an internally threaded boss 98 located on the tube 82. The tube 84 is provided with two apertures 100 aligned with the boss 98 to receive the pin member 96. To stop the passage of air through the tube 84, the needle valve 90 is screwed into the boss 98 so that the pin member 96 extends through both apertures 100 with the end of the pin member 96 abutting the inner wall of tube 82. To obtain the maximum amount of airflow through the tube 84, the needle valve 90 is unscrewed so that the end of the pin member 96 is freed from that aperture 100 most remote from the boss 98 and is withdrawn fully into the boss 98. Accordingly, the pin member 96 of the needle valve 90 is moved between the above-mentioned positions to regulate the amount of air flowing through the tube 84, which controls the amount of air entering the air chamber 48 from the tube 82.

The parts of the aerator 40, as described above, are preferably formed, as by molding or otherwise, from a suitable plastic. The plastic may be transparent so that the operation of the aerating device 40 may be viewed to determine if the device 40 is operating properly.

In operation, the outlet end 32 of the tube 28 is frictionally fitted into the sleevelike member 74 so that the end 32 contacts the abutment 76 within the sleevelike member 74. The flexible sleevelike member 74 secures the aerator 40 to the tube 28 so that the discharge portion 50 is immersed in the liquid 36 with the opening 56 being below the liquid level, whereby the cup-shaped end 86 of the tube 84 is positioned substantially above the liquid level of the liquid 36, as shown in FIG. 2.

The flow of the liquid 34, as indicated by arrow 102, passes from the outlet end 32 of the tube 28 into the conduit formed by the flange 66 and then through the opening 64 into the chamber 60. The conical shape of the chamber 60 has a decreasing cross section thereby increasing the velocity of the liquid, whereby the velocity of the liquid at the opening 62 is faster than the velocity at the opening 64.

The liquid passes from the opening 62 of the conduit portion 58 into the discharge chamber 52, where because of the position of the opening 62, no liquid enters the air chamber 48. However, because the velocity of flow of the liquid has increased, the pressure at the opening 62 has decreased, this being commonly known as a venturi effect. The decreased pressure causes the air within the air chamber 48 to be forced through the opening 54 in the air chamber 48, being forced against the flowing liquid.

The flowing liquid draws the air from the air chamber 48 and carries the air into the discharge chamber 52. Within the discharge chamber 52, the air being carried by the liquid is forced into the body of the liquid by the inner walls of discharge portion 50 because the conical shape of the discharge chamber 52 has a decreasing cross section within the discharge portion 50. Then, the mixture of the air and the liquid is discharged through the opening 56 into the liquid 36. The body of the liquid carries the air to a greater depth within the liquid 36 than the air would have been carried had the air remained on the outside of the liquid, whereby in the latter case, the liquid 36 would have immediately forced the air upwardly upon its discharge from the aerator 40.

The valve 90 may be adjusted, as stated above, to obtain the proper amount of air to be supplied to the liquid 36. It is contemplated that the sleevelike member 74 may be adaptable to fit most liquid return filter tubes enhancing its applicability and utilization.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. An aerating device for injecting a mixture of water and air into a water-containing receptacle, said aerating device comprising a housing, said housing including means for defining an air-filled chamber, a frustoconical discharge conduit communicating with said air-filled chamber, a frustoconical water-injecting conduit extending into said air-filled chamber and dividing the latter into an annular cavity of greater lateral extent than that of said discharge conduit, said water-injecting conduit terminating proximate said discharge conduit, each said frustoconical conduit extending concentrically in a common tapered direction, an air-filled conduit communicating with said air-filled chamber, said air-filled conduit terminating in an open free end portion, an air filter connected to said open free end portion, and coupling means for detachably connecting said water-injecting conduit to an external water-supplying tube in generally rotation-free slipoff relation.

2. An aerating device as claimed in claim 1 wherein said coupling means and the water-supplying tube are operatively associated in press-fit relation.

3. An aerating device as claimed in claim 2 wherein said coupling means interconnects the water-supplying tube and the water-injecting conduit in generally concentric relation.

4. An aerating device as claimed in claim 2 wherein said coupling means includes a resilient sleeve.

5. An aerating device as claimed in claim 4 wherein said coupling means includes an annular abutment flange internally of said sleeve against which the water-supplying tube is engageable.

6. An aerating device as claimed in claim 5 wherein said flange and the water-supplying tube are of generally identical internal lateral dimension.

7. An aerating device as claimed in claim 4 wherein said air-filled conduit and said resilient sleeve extend generally parallel to one another.

8. An aerating device as claimed in claim 1 wherein said air-filled conduit includes means for regulating the quantity of air inflow thereinto from said air filter and extends proximate the latter.

9. An aerating device as claimed in claim 8 wherein the latter said means includes a needle valve.

10. An aerating device as claimed in claim 1 wherein said discharge conduit is of greater elongate extent than that of said water-injecting conduit and terminates in a free end remote from said air-filled chamber, said water-injecting conduit extending entirely through said air-filled chamber.

* * * * *